United States Patent
Hara et al.

[11] Patent Number: 5,159,892
[45] Date of Patent: * Nov. 3, 1992

[54] SHIFT POSITION INDICATING DEVICE FOR AUTOMATIC TRANSMISSION

[75] Inventors: Toshiyuki Hara, Yokohama; Katsunori Shirahama, Atsugi, both of Japan

[73] Assignees: Ohi Seisakusho Co., Ltd.; Nissan Motor Co., Ltd., both of Yokohama, Japan

[*] Notice: The portion of the term of this patent subsequent to Feb. 12, 2008 has been disclaimed.

[21] Appl. No.: 729,779

[22] Filed: Jul. 10, 1991

Related U.S. Application Data

[63] Continuation of Ser. No. 420,034, Oct. 11, 1989, abandoned.

[30] Foreign Application Priority Data

Oct. 11, 1988 [JP] Japan ............ 63-131830[U]

[51] Int. Cl.⁵ .................. G01D 13/04; G09F 9/00
[52] U.S. Cl. ............................ 116/28.1; 116/334; 362/26; 362/30
[58] Field of Search ............ 116/28.1, DIG. 20, 286, 116/287, 304, 334, 335; 362/26, 30; 40/546, 616

[56] References Cited

U.S. PATENT DOCUMENTS

| | | | |
|---|---|---|---|
| 2,781,597 | 2/1957 | Doane | 40/616 |
| 4,911,096 | 3/1990 | Munakata | 116/334 |
| 4,991,535 | 2/1991 | Kobayashi et al. | 116/28.1 |

FOREIGN PATENT DOCUMENTS

| | | | |
|---|---|---|---|
| 3142098 | 5/1983 | Fed. Rep. of Germany | 116/286 |
| 2288640 | 5/1976 | France | 116/28.1 |
| 28234 | 12/1968 | Japan | 116/DIG. 20 |
| 162332 | 12/1979 | Japan | 116/28.1 |
| 57-21780 | 5/1982 | Japan | 116/28.1 |

Primary Examiner—Allan N. Shoap
Assistant Examiner—W. Morris Worth
Attorney, Agent, or Firm—Foley & Lardner

[57] ABSTRACT

Disclosed herein is a shift position indicating device for use with a shift lever. The device comprises a plastic case; a light conductive structure including a horizontal wall and a vertical wall which are integrally connected with each other, the horizontal wall having an indicating outer surface on which first and second groups of projections are integrally formed, the vertical wall having a rounded cut formed in a lower edge thereof, the light conductive structure being substantially embedded within a wall of the plastic case having the indicating outer surface of the horizontal wall exposed to the outside of the plastic case and having the lower edge of the vertical wall exposed to an interior of the plastic case; a pointer located within the plastic case below the horizontal wall of the light conductive structure, the pointer being movable with the shift lever; and a light source installed in the plastic case near the rounded cut of the verical wall. An inner layer of the wall of the plastic case is formed with a plurality of openings through which back surfaces of the first groups of projections are exposed to the interior of the plastic case.

18 Claims, 2 Drawing Sheets

SHIFT POSITION INDICATING DEVICE FOR AUTOMATIC TRANSMISSION

This application is a continuation of application Ser. No. 07/420,034, filed Oct. 11, 1989, now abandoned.

BACKGROUND OF THE INVENTION

1. Field of the Invention

The present invention relates, in general, to a position indicating device and, more particularly, to a shift position indicating device for an automatic transmission.

2. Description of the Prior Art

One of shift position indicating devices for an automatic transmission is shown in Japanese Utility Model Second Provisional Publication No. 57-21780.

The device of this publication comprises generally a case, a shift position indicating board mounted on the case and an electric lamp positioned below the board. The shift position indicating board is constructed of a transparent plate, which has position letters, such as, P, R, N, D, 2 and L, engraved thereon and has suitable numbers of semicylindrical lens portions formed thereon beside the respective letters. The rear surface of the position indicating board is entirely covered with a light shielding paint, except those portions which constitute back faces of the lens portions. Thus, in operation, only the lens portions of the board are illuminated by the light emitted from the electric lamp.

However, the device has the following drawbacks, due to its inherent, construction.

First, a troublesome and expensive painting process (viz., masking process) is needed in manufacturing of the shift position indicating boards. Thus, the production cost of the device is increased.

Second, the position letters engraved on the transparent board fail to exhibit satisfactory visibility.

SUMMARY OF THE INVENTION

It is therefore an object of the present invention to provide a shift position indicating device which is free of the above-mentioned drawbacks.

According to the present invention, there is provided a shift position indicating device for use with a shift lever. The shift position indicating device comprises a plastic case; a light conductive structure including a horizontal wall and a vertical wall which are integrally connected with each other, the horizontal wall having first and second groups of projections integrally formed thereon, the vertical wall having a rounded cut formed in a lower edge thereof, the light conductive structure being substantially embedded within a wall of the plastic case having the first and second groups of projections of the horizontal wall exposed to the outside of the plastic case and having the lower edge of the vertical wall exposed to an interior of the plastic case; a pointer located within the plastic case below the horizontal wall of the light conductive structure, the pointer being movable with the shift lever; means defining in an inner layer of the wall of the plastic case a plurality of openings through which back surfaces of the first groups of projections are exposed to the interior of the plastic case; and a light source installed in the plastic case near the rounded cut of the vertical wall.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 2:
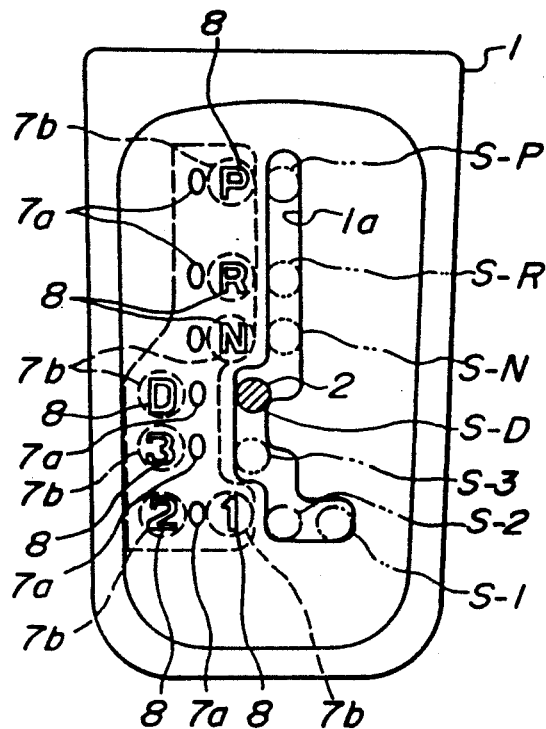
FIG. 2 is a plan view of the shift position indicating device of the invention.

Referring to the accompanying drawings, there is shown a shift position indicating device according to the present invention. As is understood from FIG. 2, the device of the invention is practically applied to a shift lever 2 which moves in a zig-zag manner upon shifting.

Designated by numeral 1 is an outer case which is molded from an opaque plastic. The outer case 1 has, at an upper cover portion (no numeral) thereof, a crooked elongate slot 1a formed therethrough. A shift lever 2 passes through the slot 1a to travel in and along the same. As is seen from FIG. 2, the slot 1a is crooked so as to guide the shift lever 2 to predetermined detent feeling work positions, which are Parking (S-P), Reverse (S-R), Neutral (S-N), Drive (S-D), Third speed (S-3), Second speed (S-2) and First speed (S-1) positions.

Figure 1:
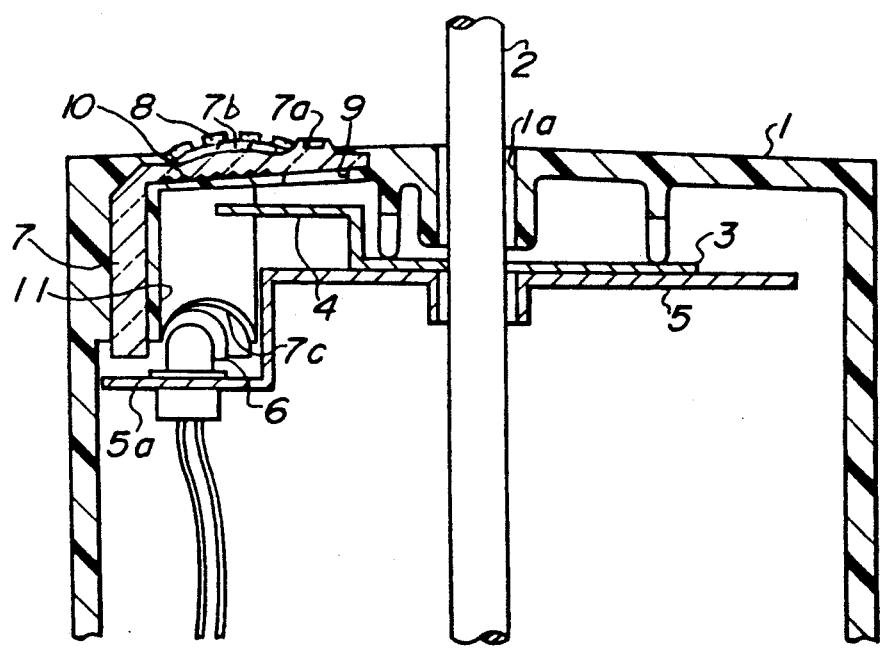
FIG. 1 is a vertically sectional front view of a shift position indicating device according to the present invention.

Designated by numeral 3 in FIG. 1 is a slide plate which is received in the outer case 1 and connected to the shift lever 2 to move therewith. The slide plate 3 has a narrow left portion 4 raised like a step to serve as a pointer. The raised narrow portion 4, that is, the pointer, has an upper surface coated with a red paint.

Designated by numeral 5 is an inner panel which is stationarily installed in the outer case 1. The abovementioned slide plate 3 moves sliding on the inner panel 5. The inner panel 5 has a left portion 5a bent downward like a step. The downwardly bent left portion 5a carries thereon an electric lamp 6 which, upon energization, illuminates an inner space defined between the outer case 1 and the inner panel 5. The illumination in the inner space illuminates the pointer r.

Figure 3:
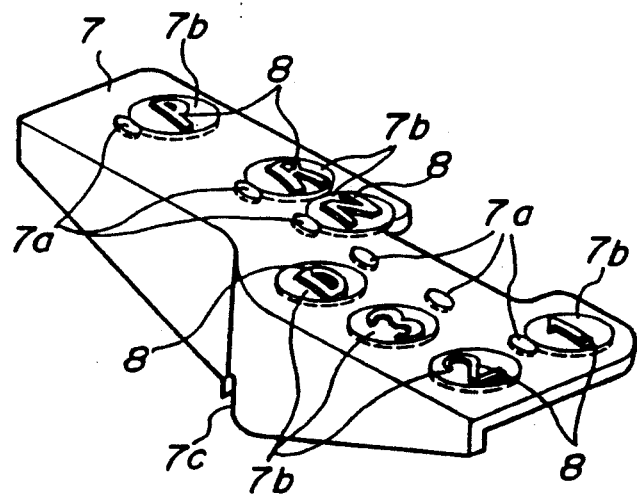
FIG. 3 is a perspective view of a shift position indicating structure used in the device of the invention.

Within the inner space, there is tightly disposed a shift position indicating structure 7 which is constructed of a molded transparent plastic and comprises, as is seen from FIG. 3, a horizontal flat major wall and a smoothly curved vertical wall. The right side of the horizontal flat major wall is shaped in compliance with the shape of the crooked elongate slot 1a of the outer case 1.

As is best seen from FIG. 3, the horizontal flat major wall of the shift position indicating structure 7 is formed with a plurality of raised lens portions 7a and a plurality of rounded stage portions 7b, which are respectively arranged at position's corresponding to the above-mentioned detent feeling work positions. The rounded stage portions 7b have raised letters P, R, N, D, 3, 2 and 1 integrally molded therewith. As is seen from FIG. 1, the inner surface of the horizontal major wall of the structure 7 is granulated at positions 10 which face the rounded stage portions 7b.

The smoothly curved vertical wall of the structure 7 has the lower edge which includes two slanted sections whose inboard portions are merged to constitute a highest middle portion of the vertical wall. The highest middle portion is formed with a rounded cut 7c. The rounded cut 7c serves as a light entrance from which the light from the electric lamp 6 enters the structure 7.

As will be understood from FIG. 1, the shift position indicating structure 7 is so arranged that only the raised lens portions 7a and the letter-carried rounded stage portions 7b are exposed to the outside of the outer case 1 having the rounded cut 7c directed toward the electric lamp 6.

It is to be noted that the structure 7 is embedded in the wall of the plastic outer case 1 by employing a monobloc molding technique. Thus, almost all of the inner surface of the structure 7 is covered with a thin inner layer 11 of the casing 1 as is seen from FIG. 1. The inner layer 11 however has openings 9 at positions which face the raised lens portions 7a. Thus, when, due to shifting of the shift lever 2, the pointer 4 comes to a certain indicating position, the pointer 4 can be viewed on an enlarged scale from the outside through the corresponding lens portion 7a.

When, for example at night, with the electric lamp 6 kept energized to produce light, the shift lever 2 is moved to a desired shift position, for example, to Drive position (S-D), the pointer 4 comes to a position just below one raised lens portion 7a which is beside the D-letter-carried rounded projection 8.

When, for example at night, the electric lamp 6 is energized to emit light, the light enters the structure 7 from the rounded cut 7c and travels within the same. Because of provision of the granulated surfaces 10, the raised letters P, R, N, D, 3, 2 and 1 on the rounded projections 8 are highly illuminated and thus these letters P, R, N, D, 3, 2 and 1 are easily recognized by a viewer.

If desired, the following modification can be made to in the invention.

That is, the raised letters P, R, N, D, 3, 2 and 1 may be directly provided on the horizontal major wall of the structure 7 without using the rounded stage portions 7b. In this case, the letters may be colored.

In the following, advantages given by the present invention will be itemed.

First, unlike the case of the afore-mentioned conventional shift position indicating device, the troublesome and expensive painting process is not needed in the present invention. Thus, productivity of the device is improved lowering the production cost.

Second, because the structure 7 is intimately embedded in the outer case 1, undesirable light leakage does not occur.

Third, since the structure 7 is constructed and arranged to travel the light from the lamp 6 therewithin, the raised letters P, R, N, D, 3, 2 and 1 on the structure 7 are highly illuminated from within. Thus, the visibility of these letters is much improved.

What is claimed is:

1. A gear shift position indicating device for use with a shift lever, comprising:
   an opaque plastic case;
   a light conductive structure having a horizontal wall and a vertical wall, the walls being integral with each other;
   first and second groups of projections integrally formed in the horizontal wall, one of said group of projections having indicia representative of gear shift position, a rounded cut formed in the lower edge of the vertical wall, the light conductive structure being embedded in the plastic case by means of monobloc molding, the first and second groups of projections on the horizontal wall being exposed to the outside of the plastic case while the lower edge of the vertical wall is contained within the interior of the plastic case;
   a pointer located within the plastic case below the horizontal wall of the light conductive structure, the pointer being movable with the shift lever;
   light conductive means in the plastic case exposing a lower surface of the horizontal wall to the interior of the plastic case; and
   a light source for illuminating the interior of the plastic case and further illuminating said projections by providing light which passes through the rounded cut in the vertical wall of the light conductive structure, the pointer being illuminated by the light source and visable on the outside of the plastic case through a projection with which it is in registration to indicate shift position.

2. A shift position indicating device as claimed in claim 1, in which said first group, of projections are lens portions integrally formed in said horizontal wall.

3. A shift position indicating device as claimed in claim 2, in which each of said second group of projections comprises:
   rounded stage portions integrally formed in said horizontal wall; and
   raised letters integrally formed on each said rounded stage portion.

4. A shift position indicating device as claimed in claim 3, in which said vertical wall of the light conductive structure is smoothly curved.

5. A shift position indicating device as claimed in claim 4, further comprising an inner panel which is stationarily installed in said plastic case, said inner panel having one end on which said light source is mounted.

6. A shift position indicating device as claimed in claim 5, further comprising a slide plate which moves together with said shift lever while sliding on said inner panel, said slide plate having said pointer integrally connected thereto.

7. A shift position indicating device as claimed in claim 6, in which said pointer is painted.

8. A shift position indicating device for use with a shift lever, comprising:
   an opaque plastic case;
   a light conductive structure embedded in said opaque plastic case by means of monobloc molding, said light conductive structure having first and second portions which are integral with each other, said second portion having a light receiving part exposed to the interior of said plastic case;
   projections integrally formed on said first portion and exposed to outside of said plastic case;
   first means for illuminating the interior of said plastic case;
   a pointer located in said plastic case and movable with said shift lever; and
   second means for permitting said pointer to be viewed from outside of said plastic case.

9. A shift position indicating device as claimed in claim 8, in which said second means comprises:
   one group of said projections; and
   means for defining respective openings in said plastic case just below said one group of projections, thereby permitting said pointer to be viewed from outside of said plastic case through a selected one of said one group of projections.

10. A shift position indicating device as claimed in claim 9, in which each of said one group of projections is a lens.

11. A shift position indicating device as claimed in claim 10, in which the projections of said one group are aligned with said first portion of said light conductive structure.

12. A shift position indicating device as claimed in claim 10, in which each of another group of said projections comprises:
   a rounded stage portion integrally formed on said first portion; and
   a raised letter integrally formed on said rounded stage portion.

13. A shift position indicating device as claimed in claim 12, in which said second portion of said light conductive structure is smoothly curved.

14. A shift position indicating device as claimed in claim 13, in which said light receiving part of said second portion of the light conductive structure has a rounded cut which is directed toward said first means.

15. A shift position indicating device as claimed in claim 14, further comprising an inner panel which is secured in aid plastic case, said inner panel having one end on which said first means is mounted.

16. A shift position indicating device as claimed in claim 15, further comprising a slide plate which moves with said shift lever while sliding on said inner panel, said slide plate having said pointer integrally connected thereto.

17. A shift position indicating device as claimed in claim 16, in which said pointer is painted.

18. A shift position indicating device as claimed in claim 12, in which said first portion of said light conductive structure has a granulated inner surface just below the other group of projections.

* * * * *